US011323004B2

(12) United States Patent
Katsura et al.

(10) Patent No.: US 11,323,004 B2
(45) Date of Patent: May 3, 2022

(54) ROTATING ELECTRIC MACHINE

(71) Applicant: EXEDY Corporation, Neyagawa (JP)

(72) Inventors: Hitoshi Katsura, Neyagawa (JP);
Taichi Kitamura, Neyagawa (JP);
Kenji Kitada, Neyagawa (JP)

(73) Assignee: EXEDY CORPORATION, Neyagawa (JP)

(*) Notice: Subject to any disclaimer, the term of this patent is extended or adjusted under 35 U.S.C. 154(b) by 268 days.

(21) Appl. No.: 16/849,190

(22) Filed: Apr. 15, 2020

(65) Prior Publication Data

US 2020/0366155 A1 Nov. 19, 2020

(30) Foreign Application Priority Data

May 13, 2019 (JP) .............................. JP2019-090808

(51) Int. Cl.
*H02K 5/20* (2006.01)
*H02K 3/12* (2006.01)
*H02K 3/28* (2006.01)
*H02K 1/16* (2006.01)

(52) U.S. Cl.
CPC ................ *H02K 5/20* (2013.01); *H02K 3/12* (2013.01); *H02K 3/28* (2013.01); *H02K 1/165* (2013.01)

(58) Field of Classification Search
CPC .. H02K 5/20; H02K 3/12; H02K 3/28; H02K 16/00; H02K 16/04; H02K 9/20
See application file for complete search history.

(56) References Cited

U.S. PATENT DOCUMENTS

| | | | | |
|---|---|---|---|---|
| 6,459,185 | B1* | 10/2002 | Ehrhart | H02K 16/04 310/156.45 |
| 8,593,029 | B2* | 11/2013 | Inoue | H02K 1/2773 310/263 |
| 10,122,246 | B2* | 11/2018 | Matsumoto | H02K 9/19 |
| 10,734,866 | B2* | 8/2020 | Yoshinori | H02K 1/2706 |
| 11,101,713 | B2* | 8/2021 | Okubo | B61C 3/00 |
| 11,183,907 | B2* | 11/2021 | Lin | H02K 15/10 |
| 11,183,911 | B2* | 11/2021 | Katsura | H02K 19/16 |
| 2012/0293039 | A1 | 11/2012 | Hayashi et al. | |
| 2019/0312487 | A1* | 10/2019 | Okamoto | B60L 1/02 |
| 2019/0363609 | A1* | 11/2019 | Barti | H02K 5/207 |
| 2019/0376512 | A1* | 12/2019 | Kobayashi | H02K 9/19 |
| 2019/0393747 | A1* | 12/2019 | Tang | H02K 5/203 |
| 2020/0177049 | A1* | 6/2020 | Raya | H02K 5/20 |
| 2020/0244123 | A1* | 7/2020 | Kang | H02K 9/19 |
| 2020/0251963 | A1* | 8/2020 | Woody | H02K 5/18 |
| 2020/0266687 | A1* | 8/2020 | Nakamatsu | H02K 7/003 |
| 2020/0321830 | A1* | 10/2020 | Oketani | H02K 1/276 |

(Continued)

FOREIGN PATENT DOCUMENTS

JP 2012-244806 A 12/2012

*Primary Examiner* — Robert W Horn
(74) *Attorney, Agent, or Firm* — United iP Counselors, LLC

(57) ABSTRACT

A rotating electric machine includes a non-rotating member, a stator fixed to the non-rotating member, a field coil fixed to the non-rotating member, disposed on an inner diameter side of the stator, and having an iron core and a winding wound around the iron core, and a rotor rotatably disposed between the stator and the iron core. A flow path through which a heat exchange medium is supplied and discharged is formed in the iron core along an axial direction thereof.

4 Claims, 7 Drawing Sheets

(56) References Cited

U.S. PATENT DOCUMENTS

| | | | |
|---|---|---|---|
| 2020/0366139 A1* | 11/2020 | Katsura | H02K 1/165 |
| 2020/0366155 A1* | 11/2020 | Katsura | H02K 19/103 |
| 2021/0152047 A1* | 5/2021 | Cox | B60K 1/00 |
| 2021/0211012 A1* | 7/2021 | Yang | H02K 15/03 |
| 2021/0288554 A1* | 9/2021 | Yao | H02K 9/193 |
| 2021/0320550 A1* | 10/2021 | Shimogaki | H02K 5/1732 |
| 2021/0320552 A1* | 10/2021 | Truett | H02K 1/32 |
| 2021/0359571 A1* | 11/2021 | Yoo | H02K 5/20 |
| 2021/0394600 A1* | 12/2021 | Absenger | B60K 1/00 |

* cited by examiner

ROTATING ELECTRIC MACHINE

CROSS-REFERENCE TO RELATED APPLICATION

This application claims the benefit of Japanese Patent Application No. 2019-090808, filed May 13, 2019.

BACKGROUND OF THE INVENTION

Field of the Invention

The present invention relates to a rotating electric machine.

Description of the Related Art

Conventionally, a rotating electric machine including a shaft, a rotor provided with a magnetic pole that rotates integrally with the shaft, a stator oppositely disposed on the outside of the rotor, a bracket rotatably supporting the shaft and accommodating the rotor and the stator, a yoke part fixed to the bracket, having an inner peripheral surface that faces the rotor via a gap, and forming a magnetic circuit together with the rotor and the stator, a bobbin engaging with an outer peripheral surface of a thin portion having an outer diameter smaller than the other portions of the yoke part, a field coil wound around the bobbin to generate magnetic flux, and a holding member joined to the thin portion to hold the bobbin in an axial direction is publicly known (for example, see Patent Document 1).

PRIOR ART DOCUMENT

Patent Document

[Patent Document 1] Japanese Patent Application Laid-Open No. 2012-244806

SUMMARY OF INVENTION

Technical Problem

However, in the conventional rotating electric machine, a configuration for suppressing heat generation due to energization during driving is not considered. For this reason, when current is supplied to the field coil, heat is generated by the electric resistance of the winding, so there is a possibility that an insulating film of the winding is destroyed. Conversely, in order to prevent the insulating film of the winding from being destroyed, it is necessary to limit the current value.

An object of the present invention is to provide a rotating electric machine having a function that enables effective cooling of a field coil.

An aspect of the present invention provides a rotating electric machine comprising a non-rotating member, a stator fixed to the non-rotating member, a field coil fixed to the non-rotating member, disposed on an inner diameter side of the stator, and having an iron core and a winding wound around the iron core, and a rotor rotatably disposed between the stator and the iron core, wherein a flow path through which a heat exchange medium is supplied and discharged is formed in the iron core along an axial direction thereof.

According to the aspect of the present invention, since the flow path through which a heat exchange medium is supplied and discharged is formed in the iron core of the field coil, it becomes possible to achieve effective cooling against heat generation by supplying current to the winding of the field coil.

DESCRIPTION OF EMBODIMENT

Hereinafter, embodiments according to the present invention will be described with reference to attached drawings. It should be noted that the following description is merely exemplary in nature and is not intended to limit the present invention, its application, or its use.

A rotating electric machine of an aspect of the present invention is applicable to HEVs (hybrid electric vehicles), EVs (electric vehicles), and other devices that include an electric motor as a component. In the present embodiment, a rotating electric machine for an electric vehicle (EV) will be described as an example.

Figure 1:
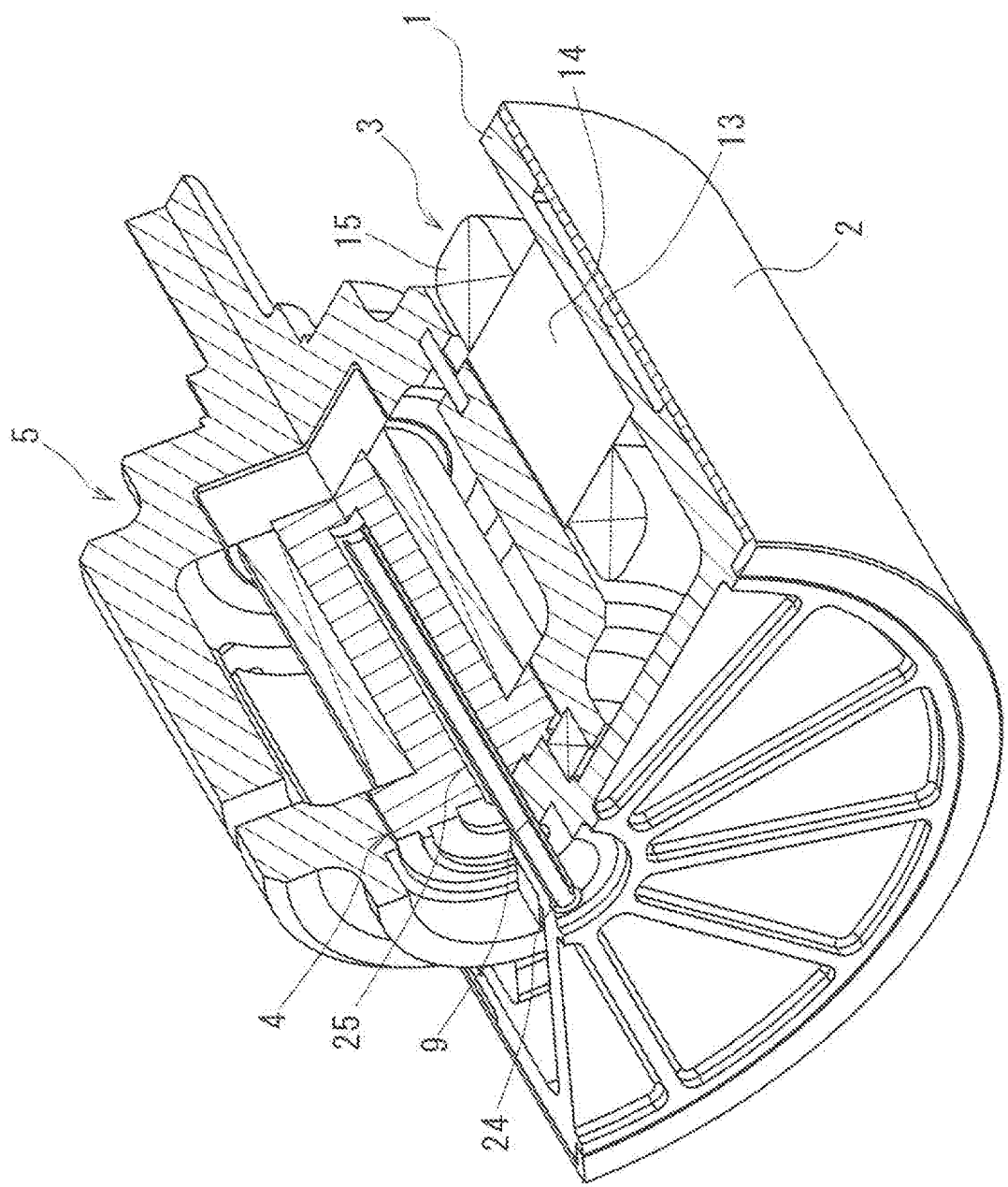
FIG. 1 is a partially cutaway perspective view of a rotating electric machine according to the present embodiment.

FIG. 1 is a partially cutaway perspective view of the rotating electric machine according to the present embodiment. The rotating electric machine includes a housing 1 that is an example of a non-rotating member, a jacket 2 that covers an outer peripheral surface of the housing 1, and a stator 3, a iron core 4 of a field coil and a rotor 5 that are provided in the housing 1. The rotating electric machine is configured that the rotor 5 rotates around the iron core 4 with respect to the housing 1, the stator 3 and the iron core 4.

Figure 2:
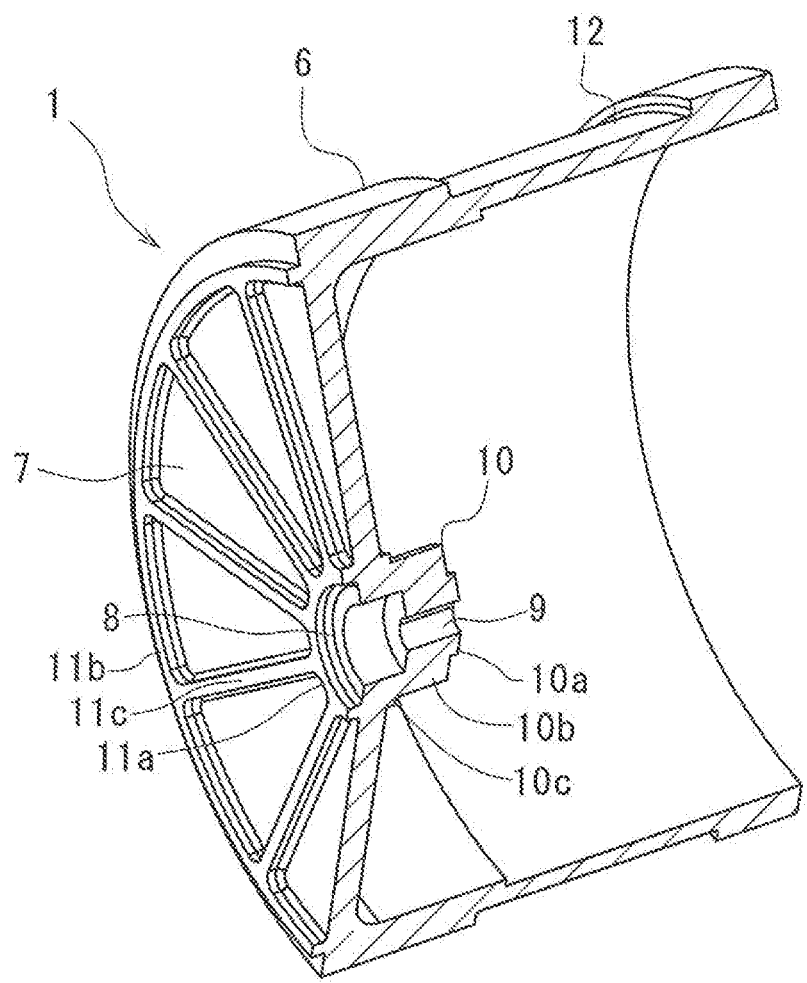
FIG. 2 is a partially cutaway perspective view showing a housing of FIG. 1.

As shown in FIG. 2, the housing 1 includes a bottomed cylindrical housing body 6 and a lid (not shown) that covers an opening on one end side of the housing body 6. A stepped recessed portion 8 is formed in a center of a wall portion 7 on the other end side of the housing body 6. A through hole 9 is formed at a center of the stepped recessed portion 8. On an inner surface side of the wall portion 7, a guide portion 10 is formed by the stepped recessed portion 8. The guide portion 10 has a stepped shape and includes a first convex portion 10a, a second convex portion 10b, and a third convex portion 10c from a tip side thereof. On an outer end surface of the wall portion 7, an inner diameter side annular rib 11a around the stepped recessed portion 8, an outer diameter side annular rib 11b of an outer periphery, and a plurality of linear ribs 11*c* extending radially and connecting the inner diameter side annular rib 11*a* and the outer diameter side annular rib 11*b* are formed. Further, an annular groove 12 is formed on an outer peripheral surface of the housing body 6 over the whole circumference.

The jacket 2 is formed in a cylindrical shape that covers the outer peripheral surface of the housing 1 as shown in FIG. 1. The jacket 2 covers the annular groove 12 of the housing 1 and defines a cooling water passage 13 for flowing cooling water as an example of a heat exchange medium. A plurality of communication holes (not shown) communicating with the cooling water passage 13 are formed in the jacket 2, and allows the cooling water to flow through the cooling water passage 13 via these communication holes.

The stator 3 includes a stator core 14 and a coil 15. The stator core 14 is obtained by laminating a plurality of electromagnetic steel plates. The stator core 14 is attached to the housing 1 such that a lamination direction of the electromagnetic steel plates coincides with an axial direction of the iron core 4. The coil 15 is wound around the stator core 14 to protrude from both ends in the axial direction.

Figure 3:
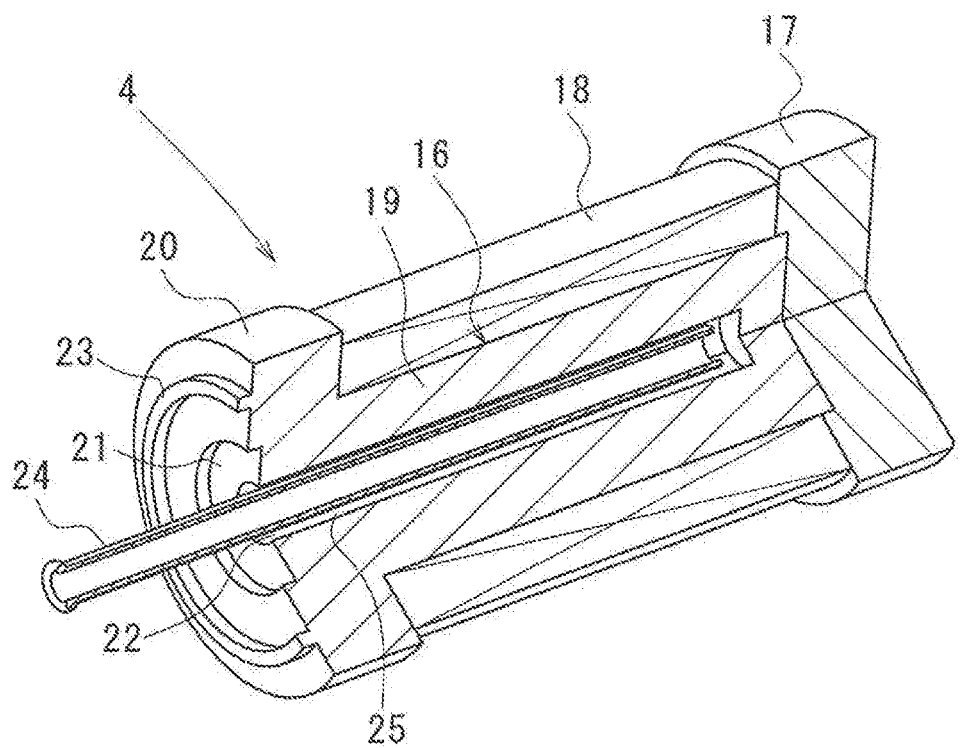
FIG. 3 is a partially cutaway perspective view showing an iron core of a field coil of FIG. 1.

The iron core 4 of the field coil includes a field coil core body 16, a field coil core flange portion 17, and a field coil 18, as shown in FIG. 3. The field coil core body 16 includes an iron core portion 19 and a flange portion 20. A circular positioning recessed portion 21 is formed at a center of the end face of the flange portion 20. A flow hole 22 is formed at a center of the positioning recessed portion 21. The flow hole 22 extends beyond the central position in a longitudinal direction of the iron core portion 19 and reaches near a tip of the iron core portion 19. An annular convex portion 23 is formed on an outer peripheral side of the end face of the flange portion 20. The field coil core flange portion 17 is fixed to the tip of the iron core portion 19. The field coil 18 is wound around a coil winding portion formed between the field coil 18 and the flange portion 20.

The field coil core flange portion 17 of the iron core 4 is fixed to the guide portion 10 of the housing 1. The first convex portion 10*a* of the guide portion 10 is fitted into the positioning recessed portion 21 of the field coil core flange portion 17, and the second convex portion 10*b* of the guide portion 10 is fitted into the annular convex portion 23. Thus, the iron core 4 is supported by the housing 1 in a so-called cantilever state. In this state, the through hole 9 of the housing 1 and the flow hole 22 of the iron core 4 communicate with each other. A pipe 24 having an outer diameter smaller than the flow hole 22 is inserted into the flow hole 22 through the through hole 9. Thereby, when cooling water is supplied into the flow hole 22 through a center hole of the pipe 24 (first flow path), the cooling water reaches a bottom of the flow hole 22 through the center hole of the pipe 24, flows through an annular passage 25 (second flow path) formed between the flow hole 22 and the pipe 24 to a through hole 9 side, and then is discharged to the outside of the flow hole 22. The annular convex portion 23 and the second convex portion 10*b* are fitted to form an annularly connected groove on the outer peripheral portion of the second convex portion 10*b*. A bearing 26 is disposed in this groove.

Figure 4:
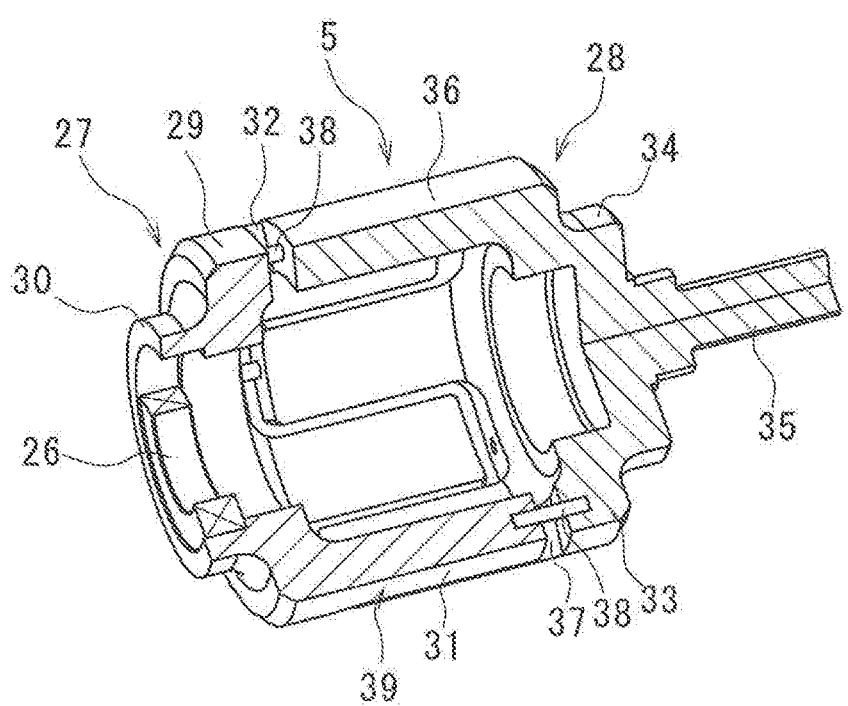
FIG. 4 is a partially cutaway perspective view showing a rotor of FIG. 1.

As shown in FIG. 4, the rotor 5 includes a first rotor portion 27 and a second rotor portion 28, and is rotatably supported on an outer peripheral side of the iron core 4 with respect to the stator 3 and the iron core 4.

The first rotor portion 27 includes a first annular portion 29 having a cylindrical portion 30 which has a smaller diameter than the first annular portion 29 and protrudes from the first annular portion 29. The guide portion 10 of the housing 1 rotatably supports the first annular portion 29 via a bearing 26. Further, a plurality of first extending portions 31 protrude from the first annular portion 29 to an opposite side of the cylindrical portion 30. The first extending portions 31 are formed at a predetermined pitch in a circumferential direction of the first annular portion 29, and a portion between two adjacent first extending portions 31 serves as a first relief portion 32. The first rotor portion 27 is made of a magnetic material, and becomes an S pole, for example, when current is supplied to the winding of the field coil 18.

The second rotor portion 28 includes a second annular portion 33. The second annular portion 33 is rotatably supported with respect to the stator 3 and the field coil 18. A pedestal portion 34 having a smaller diameter than the second annular portion 33 protrudes from the second annular portion 33. A rotary shaft 35 protrudes from a center of the pedestal portion 34. The rotational force of the rotary shaft 35 is transmitted to a driven part (not shown). Further, a plurality of second extending portions 36 protrude from the second annular portion 33 to an opposite side to the pedestal portion 34. The second extending portions 36 are formed at a predetermined pitch in a circumferential direction of the second annular portion 33, and a portion between two adjacent second extending portions 36 serves as a second relief portion 37. The second rotor portion 28 is made of a magnetic material, and becomes an N pole, for example, when current is supplied to the winding of the field coil 18.

The first rotor portion 27 and the second rotor portion 28 are connected to each other by positioning pins 38 which are electrically insulated in a state where the first extending portion 31 of the first rotor portion 27 and the second extending portion 36 of the second rotor portion 28 are positioned at the second relief portion 37 of the second rotor portion 28 and the first relief portion 32 of the first rotor portion 27, respectively. Thereby, the first rotor portion 27 and the second rotor portion 28 are prevented from displacing in a circumferential direction and an axial direction of the rotor 5. The first extending portion 31 and the second extending portion 36 form a cylindrical portion 39.

In the rotating electric machine having the above-described configuration, the driven part drives via the rotary shaft 35 by supplying current to the coil 15 from an inverter (not shown) and by electrically rotating the rotor 5. At this time, the coil 15 itself generates heat by supplying current to the coil 15. Therefore, cooling water is supplied to a cooling water passage 13 formed by the housing 1 and the jacket 2. The supplied cooling water flows through the cooling water passage 13 and absorbs internal heat from the outer peripheral surface of the housing 1. Further, cooling water is supplied to the flow hole 22 of the iron core 4 via the pipe 24. The supplied cooling water flows through the annular passage 25 formed between the flow hole 22 and the pipe 24 to absorb the heat of the field coil 18 via the iron core 4.

As described above, according to the rotating electric machine of the embodiment, the cooling water is supplied not only to the cooling water passage 13 between the housing 1 and the jacket 2 but also to an inside of the iron core 4, thereby enabling cooling also from the inside. Therefore, despite the configuration in which the iron core 4 having the field coil 18 is disposed on an inner diameter side of the rotor 5, the heat generated from the field coil 18 is effectively removed, and a good driving state can be secured.

Note that the present invention is not limited to the configuration described in the above embodiment, and various modifications are possible.

In the above embodiment, the cooling system is a water cooling system, but a cooling system using another heat exchange medium such as an oil cooling system may be used.

In the above embodiment, the cylindrical portion 39 of the rotor 5 is formed in a cylindrical shape having a substantially uniform thickness. However, a part of the cylindrical portion 39 may be thinned or thickened.

Figure 5:
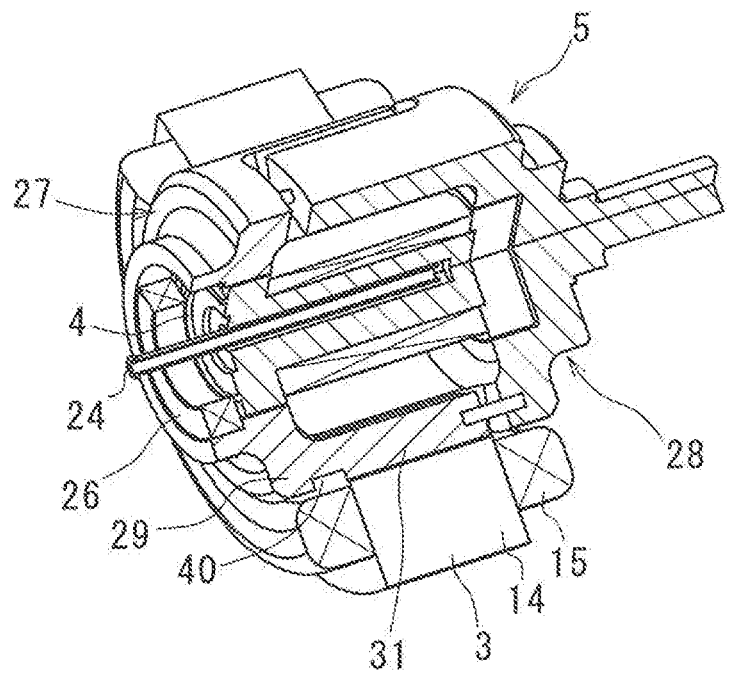
FIG. 5 is a partially cutaway perspective view of a rotating electric machine according to another embodiment.

In FIG. 5, groove portions 40 (only the groove portion 40 of a first annular portion 29 side is shown) extending the whole circumference in a circumferential direction with respect to a rotary shaft of the rotor 5 are respectively formed on a surface of each rotor portion 27 facing the stator 3 (that is, the outer peripheral surface of the first rotor portion 27 and the outer peripheral surface of the second rotor portion 28). Each groove portion has, for example, a substantially rectangular cross section and a substantially constant width and depth. The groove portion 40 of the first rotor portion 27 is provided at one end of the first extending portion 31 that is farther from the second annular portion 33 of the second rotor portion 28 in an extending direction of the rotary shaft of the rotor 5. The groove portion 40 of the second rotor portion 28 is provided at one end of the second extending portion 36 that is farther from the first annular portion 29 of the first rotor portion 27. Due to the groove portion 40, a radial dimension of the rotor 5 with respect to the rotary shaft at one end of the rotor 5 at a portion facing the stator 3 in the extending direction of the rotary shaft, and the radial dimension at a portion (for example, the center) different from one end of the rotor 5 at a portion facing the stator 3 in the extending direction of the rotary shaft are different. With such a configuration, A magnetic flux can be concentrated on a portion from the center of the stator 3 toward the rotor 5 as compared with a rotating electric machine having no groove portion 40. As a result, a magnetic flux can be efficiently made to flow from the rotor 5 to the stator 3 to stabilize the rotating state of the rotor 5 and improve the torque of the rotating electric machine.

Figure 6:
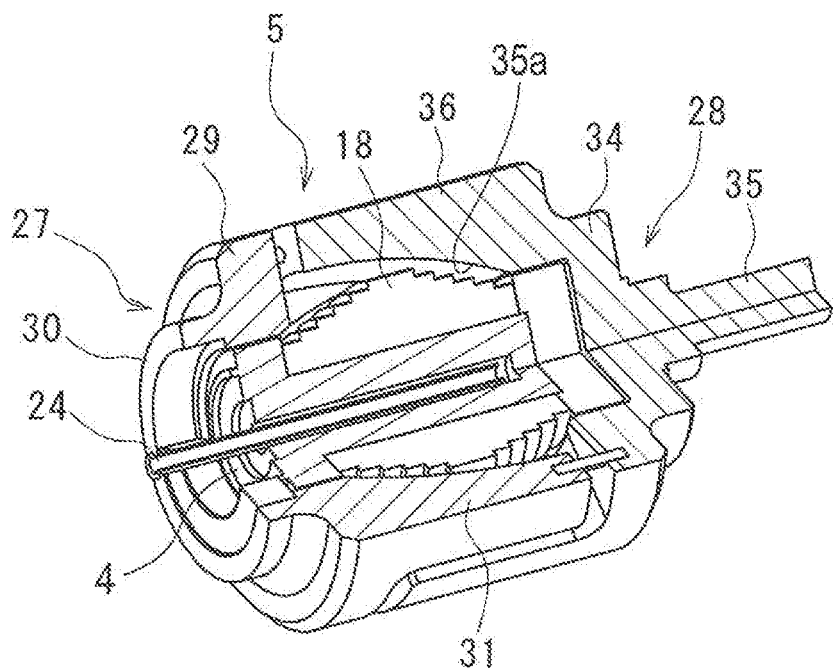
FIG. 6 is a partially cutaway perspective view of a rotating electric machine according to another embodiment.

In FIG. 6, inner surfaces of the first extending portion 31 of the first rotor portion 27 and the second extending portion 36 of the second rotor portion 28 are configured by curved surfaces 35a that gradually change in thickness toward the outer diameter toward a tip of the rotor 5. In other words, each of the rotor portions 27 and 28 of the rotor 5 has, at a portion facing the stator 3, an inclined surface 51 that faces the iron core 4 and inclined to separate from the iron core 4 as going toward a center from one end in the extending direction of the rotary shaft of the rotor 5. Each inclined surface 51 is disposed to face the iron core 4 in each of the first extending portion 31 of the first rotor portion 27 and the second extending portion 36 of the second rotor portion 28. Each inclined surface 51 is curved in a radial direction with respect to the rotary shaft of the rotor 5 and in a direction away from the iron core 4. That is, a thickness of the first extending portion 31 and the second extending portion 36 is thicker on the base portion side, and is gradually thinner toward the tip. Due to the inclined surface 51, the radial dimension of the rotor 5 with respect to the rotary shaft at one end of the rotor 5 at a portion facing the stator 3 in the extending direction of the rotary shaft, and the radial dimension at a portion (for example, the center) different from one end of the rotor 5 at a portion facing the stator 3 in the extending direction of the rotary shaft are different. With this configuration, it is possible to obtain a substantially uniform magnetic flux distribution at a portion of the second extending portion 36 facing the stator 3 as compared with a rotating electric machine that does not have the inclined surface 51.

As a result, a magnetic flux can be efficiently made to flow from the rotor 5 to the stator 3, and the torque of the rotating electric machine can be improved.

In this case, the field coil 18 wound around the iron core portion 19 of the iron core 4 preferably has a radial outer edge extending along the inclined surface 51 of the rotor 5. In FIG. 6, the field coil 18 has, for example, a stepped shape, that is, a step-like shape in which a radial outer edge approaches the iron core 4 in a radial direction of the field coil 18 as going from the center to both ends in the extending direction of the rotary shaft of the rotor 5. In FIG. 6, the field coil 18 has a rugby ball shape, an elliptical shape, or a spindle shape as a whole along the inner surface shape of the first extending portion 31 and the second extending portion 36 so that the field coil 18 is wound to form a plurality of steps. Thus, an effective cross-sectional area of the field coil 18 can be increased by effectively utilizing a space inside the rotor 5. Further, since the number of turns of the field coil 18 can be increased, a winding length of the field coil 18 in the extending direction of the rotary shaft of the rotor 5 can be reduced as compared with the rotating electric machine of FIG. 1. As a result, the iron core 4 is shortened in the extending direction of the rotary shaft of the rotor 5, and the rotating electric machine can be downsized in the extending direction of the rotary shaft of the rotor 5. Note that the same effect can be obtained even when the outer edge of the field coil 18 is not step-like shaped but linear or curved.

In the above-described embodiment, the first rotor portion 27 and the second rotor portion 28 are connected by the positioning pins 38. However, the following configuration may be adopted.

Figure 7:
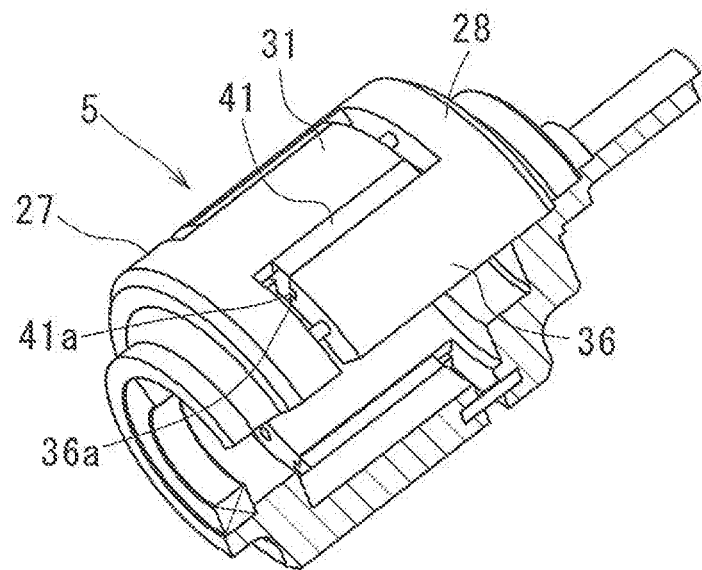
FIG. 7 is a partially cutaway perspective view of a rotor according to another embodiment.

In FIG. 7, a first intermediate member 41 made of a non-magnetic material is disposed between the first rotor portion 27 and the second rotor portion 28. Specifically, the first intermediate member 41 is disposed to fill a circumferential gap between the first extending portion 31 and the second extending portion 36. Grooves 36a are formed in the first extending portion 31 and the second extending portion 36 at a center of a thickness direction thereof from a tip toward a base (the groove 36a of a first extending portion 31 side is not shown). On both side surfaces of the first intermediate member 41, ridges 41a extending in a longitudinal direction of the first intermediate member 41 at a center of a thickness direction thereof and fitted into the grooves are formed, respectively. The groove 36a and the ridge 41a may be rectangular in cross section. However, if the groove 36a and the ridge 41a are configured to be slid and engaged from an end face side by forming a T-shaped cross section, it is preferable that displacement in the radial direction can be reliably prevented.

Figure 8:
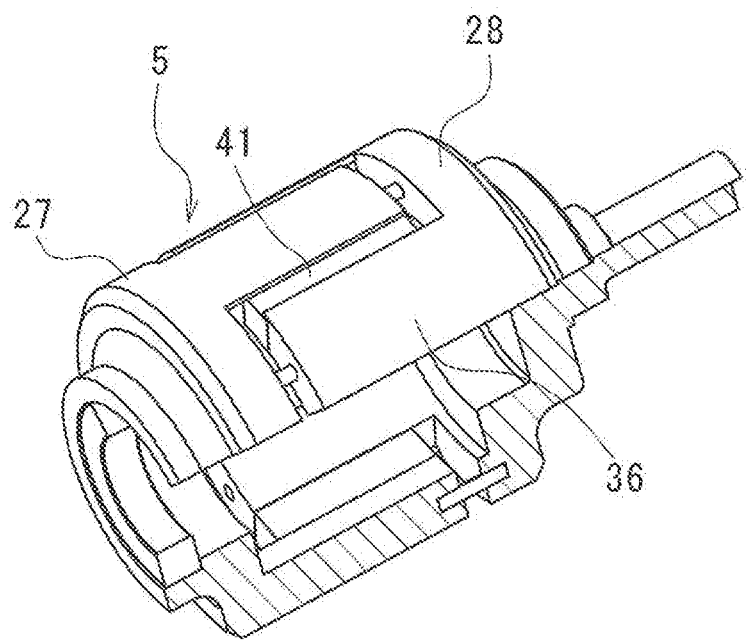
FIG. 8 is a partially cutaway perspective view of a rotor according to another embodiment.

In FIG. 8, the first intermediate member 41 made of a permanent magnet is disposed between the first rotor portion 27 and the second rotor portion 28.

Figure 9:
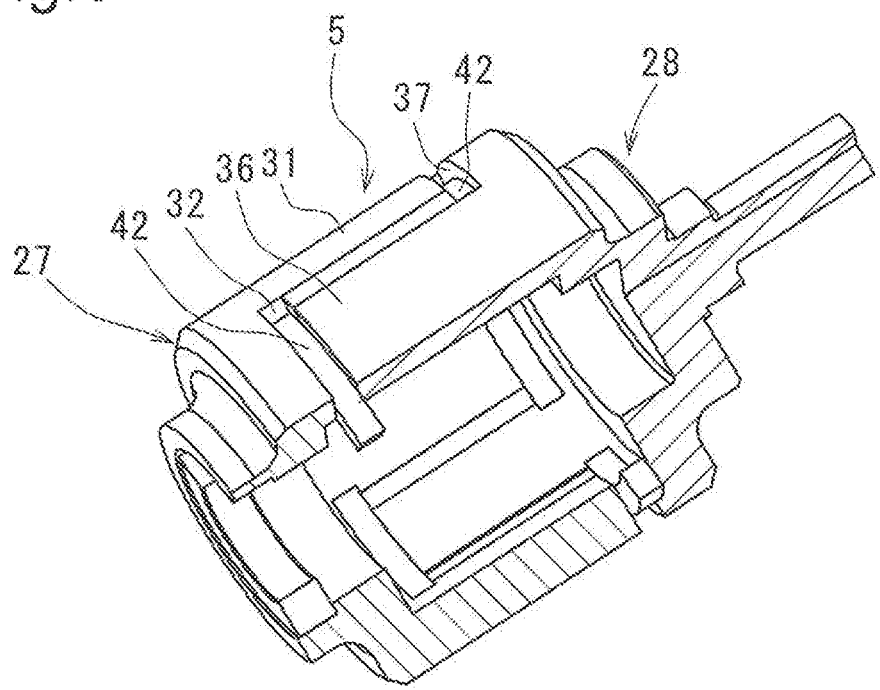
FIG. 9 is a partially cutaway perspective view of a rotor according to another embodiment.

In FIG. 9, between the tip of the first extending portion 31 and the second relief portion 37, and between the tip of the second extending portion 36 and the first relief portion 32, a second intermediate member 42 made of a permanent magnet is disposed. The second intermediate member 42 may be made of a non-magnetic material as in the case of the first intermediate member 41. Also in this case, similarly to the first intermediate member 41, a groove is formed in the first rotor portion 27 and the second rotor portion 28, while a ridge may be formed in the second intermediate member 42, and both may be fitted. Accordingly, the first intermediate member 41 prevents the displacement of the rotor 5 in the circumferential direction, and the second intermediate member 42 prevents the displacement of the rotor 5 in the axial direction.

Figure 10:
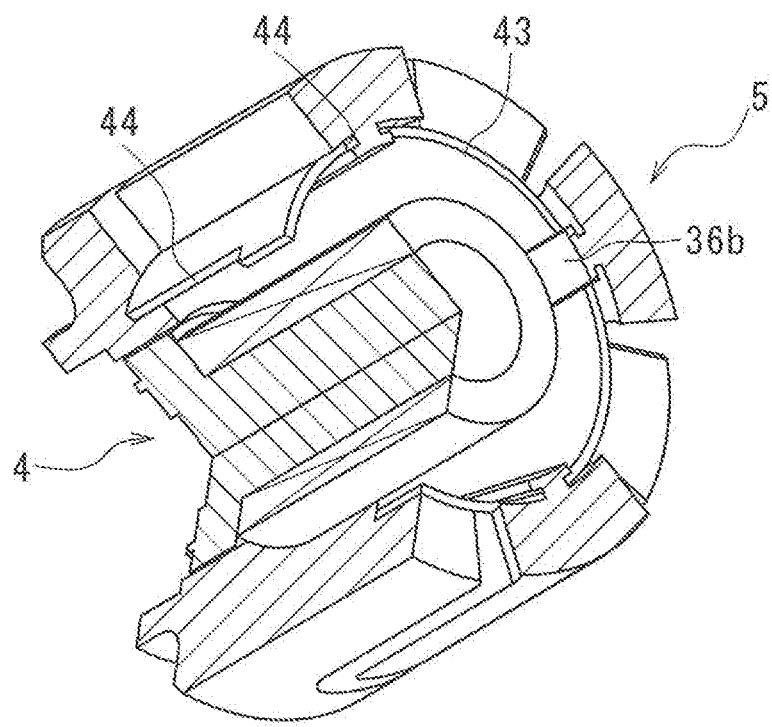
FIG. 10 is a partially cutaway perspective view of a rotor and an iron core of a field coil according to another embodiment.

In FIG. 10, a reinforcing ring 43 is disposed on an inner diameter side of the rotor 5. The reinforcing ring 43 has a hollow cylindrical shape, and is formed with a plurality of slits 44 extending in a longitudinal direction of the reinforcing ring 43 from opening edges of both ends. The slits 44 are formed at a position corresponding to each first extending portion 31 of the first rotor portion 27 on one end side of the reinforcing ring 43, and formed at a position corresponding to each second extending portion 36 of the second rotor portion 28 on the other end side. A ridge 36b having a T-shaped cross section that engages with each slit 44 is formed in each first extending portion 31 and each second extending portion 36 (the ridge 36b of a first extending portion 31 side is not shown). According to the configuration of FIG. 10, it is possible to position the first rotor portion 27 and the second rotor portion 28 while improving the rotation strength of the rotor 5 without the first intermediate member 41 and the second intermediate member 42 as shown in FIG. 9.

In the above-described embodiment, the flow hole 22 is formed at the center of the iron core portion 19 of the iron core 4. However, the flow hole 22 may be configured as follows.

Figure 11:
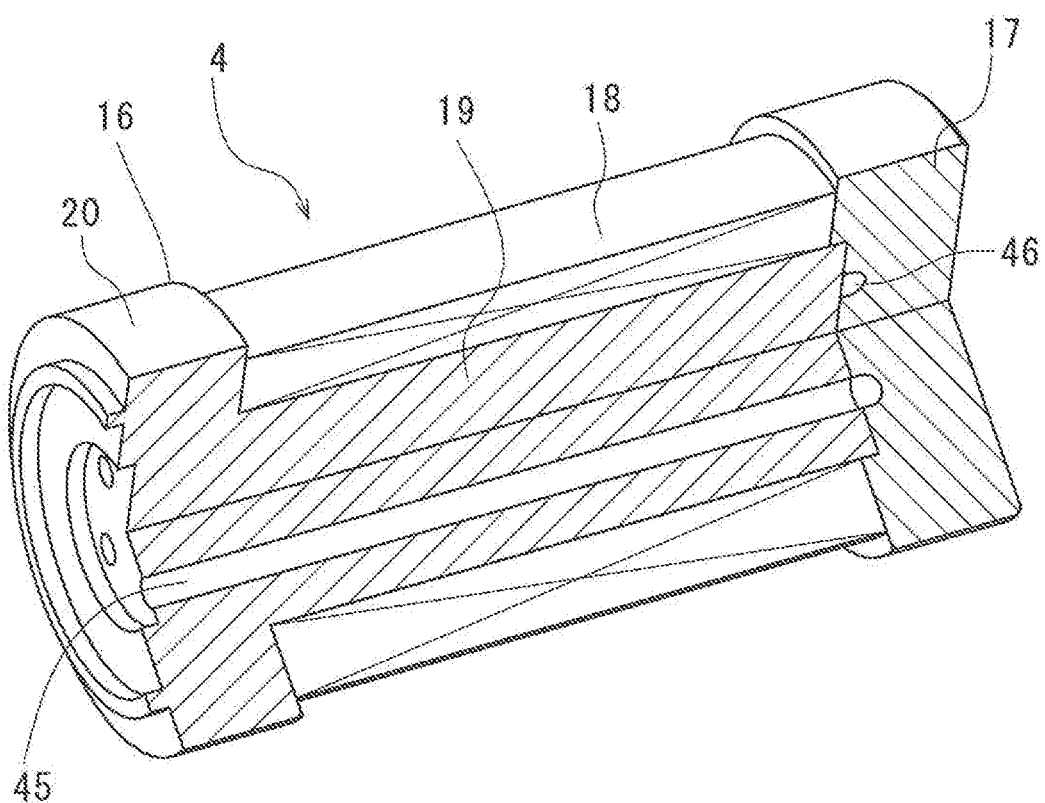
FIG. 11 is a partially cutaway perspective view of an iron core of a field coil according to another embodiment.

In FIG. 11, a plurality of flow holes 45 are formed on the same circumference on the outer peripheral side of the iron core portion 19. Each flow hole 45 penetrates the iron core portion 19 in the extending direction and is opened at both ends of the iron core portion 19. The field coil core flange portion 17 is formed with a groove 46 through which the plurality of flow holes 45 communicate. With this configuration, a heat exchange medium, which has flowed in one of the flow holes 45 from one end of the iron core portion 19, flows to the other end, and then flows through the groove 46 to flow to one end through any of the remaining other flow holes 45. According to this, cooling can be performed on the outer peripheral side of the iron core portion 19, and the cooling effect can be further exhibited as compared with the case where the flow hole is provided at the central portion.

Although the various embodiments of the present disclosure have been described in detail with reference to the drawings, a description will be given in conclusion of various aspects of the present disclosure.

A rotating electric machine according to a first aspect of the present invention comprises:
a non-rotating member;
a stator fixed to the non-rotating member;
a field coil fixed to the non-rotating member, disposed on an inner diameter side of the stator, and having an iron core and a winding wound around the iron core; and
a rotor rotatably disposed between the stator and the iron core, wherein
a flow path through which a heat exchange medium is supplied and discharged is formed in the iron core along an axial direction thereof.

With the rotating electric machine according to the first aspect, a heat exchange medium is caused to flow in the flow path formed in the iron core, so that the winding of the field coil can be effectively cooled. In addition, the field coil can be disposed on the inner diameter side of the rotor, and a compact configuration that does not increase in size in an axial direction can be achieved.

In a rotating electric machine according to a second aspect, the flow path of the iron core includes a flow hole formed from a first end of the iron core in the axial direction toward a second end of the iron core in the axial direction, and a pipe inserted into the flow hole, and
a first flow path is configured in the pipe, and a second flow path communicating with the first flow path is configured between the flow hole and the pipe.

With the rotating electric machine according to the second aspect, a flow path for circulating a heat exchange medium can be formed with a simple configuration using the flow hole and the pipe, and effective cooling can be realized.

In a rotating electric machine according to a third aspect,
the flow path of the iron core is configured by a plurality of flow holes formed from a first end of the iron core in the axial direction toward a second end of the iron core in the axial direction, and a communication hole communicating the plurality of flow holes on a second end side of the iron core.

With the rotating electric machine according to the third aspect, it is possible to form a flow path that supplies a heat exchange medium from one of the flow holes and discharges a heat exchange medium from the other flow hole through the communication hole. Thus, the flow path can be constituted only by the iron core without requiring a separate member.

In a rotating electric machine according to a fourth aspect,
the flow hole is formed on an outer diameter side of the iron core excluding a shaft center thereof.

With the rotating electric machine according to the fourth aspect, a flow path can be formed near the winding of the field coil to be cooled, and the cooling effect can be enhanced.

The present invention is applicable to, for example, HEVs (hybrid electric vehicles), EVs (electric vehicles), and other devices that include an electric motor as a component.

REFERENCE SIGNS LIST

1: housing
2: jacket
3: stator
4: field coil iron core
5: rotor
6: housing body
7: wall portion
8: stepped recessed portion
9: through hole
10: guide portion
11: rib
12: annular groove
13: cooling water passage
14: stator core
15: coil
16: field coil core body
17: field coil core flange portion
18: field coil
19: iron core portion
20: flange portion
21: positioning recessed portion
22: flow hole
23: annular convex portion
24: pipe (flow path)
25: annular passage (flow path)
26: bearing
27: first rotor portion
28: second rotor portion
29: first annular portion 30: cylindrical portion
31: first extending portion
32: first relief portion
33: second annular portion
34: pedestal portion
35: rotary shaft
36: second extending portion
37: second relief portion
38: positioning pin
39: cylindrical portion
40: groove portion
41: first intermediate member
42: second intermediate member
43: reinforcing ring
44: slit
45: flow hole
46: groove
51: inclined surface

The invention claimed is:

1. A rotating electric machine, comprising:
a non-rotating member;
a stator fixed to the non-rotating member;
a field coil fixed to the non-rotating member, disposed on an inner diameter side of the stator, and having an iron core and a winding wound around the iron core; and
a rotor rotatably disposed between the stator and the iron core, wherein
a flow path through which a heat exchange medium is supplied and discharged is formed in the iron core along an axial direction thereof.

2. The rotating electric machine according to claim 1, wherein
the flow path of the iron core includes a flow hole formed from a first end of the iron core in the axial direction toward a second end of the iron core in the axial direction, and a pipe inserted into the flow hole, and
a first flow path is configured in the pipe, and a second flow path communicating with the first flow path is configured between the flow hole and the pipe.

3. The rotating electric machine according to claim 1, wherein
the flow path of the iron core is configured by a plurality of flow holes formed from a first end of the iron core in the axial direction toward a second end of the iron core in the axial direction, and a communication hole communicating the plurality of flow holes on a second end side of the iron core.

4. The rotating electric machine according to claim 3, wherein
the flow hole is formed on an outer diameter side of the iron core excluding a shaft center thereof.

* * * * *